(12) United States Patent
Kaszubowski et al.

(10) Patent No.: US 11,881,331 B2
(45) Date of Patent: Jan. 23, 2024

(54) GASKET FOR AN ELECTRIC CABLE

(71) Applicant: Auto-Kabel Management GmbH, Hausen i.W. (DE)

(72) Inventors: Franz-Heinz Kaszubowski, Wassenberg (DE); Andreas Lienert, Wegberg-Arsbeck (DE); Abdolrahman Bagheri, Aachen (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 18/041,208

(22) PCT Filed: Jul. 7, 2021

(86) PCT No.: PCT/EP2021/068844
§ 371 (c)(1),
(2) Date: Feb. 9, 2023

(87) PCT Pub. No.: WO2022/033776
PCT Pub. Date: Feb. 17, 2022

(65) Prior Publication Data
US 2023/0245801 A1    Aug. 3, 2023

(30) Foreign Application Priority Data
Aug. 13, 2020   (DE) .................. 10 2020 004 934.6

(51) Int. Cl.
| | |
|---|---|
| *H01B 17/58* | (2006.01) |
| *H02G 3/22* | (2006.01) |
| *H02G 15/013* | (2006.01) |

(52) U.S. Cl.
CPC ............ *H01B 17/583* (2013.01); *H02G 3/22* (2013.01); *H02G 15/013* (2013.01)

(58) Field of Classification Search
None
See application file for complete search history.

(56) References Cited

U.S. PATENT DOCUMENTS

| | | | | |
|---|---|---|---|---|
| 2,996,567 | A | * | 8/1961 | Channell .............. H02G 15/013 174/91 |
| 4,232,184 | A | * | 11/1980 | Faust ................... H02G 15/013 174/41 |

(Continued)

FOREIGN PATENT DOCUMENTS

| | | | | |
|---|---|---|---|---|
| CN | 102011729 A | * | 4/2011 | ............ F04C 23/008 |
| CN | 102084563 A | * | 6/2011 | ......... B60R 16/0222 |

(Continued)

OTHER PUBLICATIONS

German Patent Office, Office Action, Application No. 10 2020 004 934.6, dated Apr. 9, 2021, 9 pages (in German).

(Continued)

*Primary Examiner* — Timothy J. Dole
*Assistant Examiner* — Muhammed Azam
(74) *Attorney, Agent, or Firm* — Sunstein LLP (57) ABSTRACT

A grommet for an electrical cable, comprising a grommet extending in a longitudinal direction from a first end face to a second end face and having a through passage, the through passage being enclosed by an inner peripheral surface of the grommet, and at least two longitudinally spaced inwardly facing sealing lips disposed on the inner peripheral surface of the grommet, characterized in that the grommet has at least two longitudinally juxtaposed sealing regions spaced apart by a circumferential separation region, that a first sealing region of the sealing regions faces the first end face and a second sealing region of the sealing regions faces the second end face, and that the separation region has a smaller wall thickness than the sealing regions.

16 Claims, 9 Drawing Sheets

(56) References Cited

U.S. PATENT DOCUMENTS

| | | | |
|---|---|---|---|
| 5,155,303 A | 10/1992 | Bensel, III et al. | |
| 5,701,634 A | 12/1997 | Uemura et al. | |
| 5,886,300 A * | 3/1999 | Strickler | G02B 6/4447 174/92 |
| 6,218,620 B1 * | 4/2001 | Michel | H02G 15/117 174/92 |
| 6,240,903 B1 * | 6/2001 | Kurozumi | F02F 7/006 174/72 A |
| 6,438,828 B1 | 8/2002 | Uchiyama | |
| 2010/0108020 A1 * | 5/2010 | Miretti | H02G 3/0675 174/653 |
| 2011/0042123 A1 * | 2/2011 | Sempliner | E04F 15/024 174/152 G |
| 2015/0008032 A1 * | 1/2015 | Nakai | B60R 16/0222 174/650 |
| 2016/0005516 A1 * | 1/2016 | Okuhara | B60R 16/0222 174/650 |
| 2017/0213620 A1 * | 7/2017 | Lausch | H01B 7/08 |
| 2018/0265018 A1 | 9/2018 | Yabashi | |
| 2018/0345886 A1 * | 12/2018 | Tazarine | B60L 7/12 |
| 2020/0353881 A1 * | 11/2020 | Toyoda | B60R 16/0222 |
| 2021/0239239 A1 * | 8/2021 | Haynes | F16L 5/14 |
| 2021/0241944 A1 * | 8/2021 | Yamaguchi | H01B 17/583 |
| 2022/0299298 A1 * | 9/2022 | Betscher | F42B 3/12 |

FOREIGN PATENT DOCUMENTS

| | | | | |
|---|---|---|---|---|
| CN | 102379068 A | | 3/2012 | |
| CN | 102656397 A | | 9/2012 | |
| CN | 103415969 A | * | 11/2013 | B60R 16/0222 |
| CN | 105575527 A | * | 5/2016 | B60R 16/0215 |
| CN | 107826055 A | * | 3/2018 | B60R 16/0215 |
| CN | 210830473 U | | 6/2020 | |
| DE | 43 41 384 A1 | | 6/1994 | |
| DE | 10009686 A1 | * | 9/2000 | B60R 16/0222 |
| DE | 10047715 A1 | * | 4/2002 | H02G 15/013 |
| DE | 102005016340 B3 | * | 8/2006 | F16L 5/10 |
| DE | 102005052832 A1 | * | 5/2007 | B60J 5/0418 |
| DE | 102007015110 A1 | * | 10/2008 | B60R 16/0222 |
| DE | 10 2008 002 616 A1 | | 12/2009 | |
| DE | 102011089515 A1 | * | 6/2013 | B60R 16/0215 |
| DE | 102012105290 A1 | * | 12/2013 | H02G 3/083 |
| DE | 212012000102 U1 | * | 2/2014 | G02B 6/4471 |
| DE | 10 2013 002 445 A1 | | 8/2014 | |
| DE | 10 2014 212 677 A1 | | 1/2015 | |
| DE | 10 2014 102 260 A1 | | 8/2015 | |
| DE | 102006042368 B4 | * | 1/2016 | H01R 13/5208 |
| DE | 10 2017 121 459 A1 | | 3/2019 | |
| DE | 20 2018 101 152 U1 | | 6/2019 | |
| DE | 102018010251 A1 | * | 12/2019 | |
| EP | 0579641 B1 | * | 4/1992 | |
| EP | 0660481 B1 | * | 5/1997 | |
| EP | 0 823 763 A1 | | 2/1998 | |
| EP | 1020971 A2 | * | 7/2000 | H02G 3/088 |
| EP | 2541114 A1 | * | 1/2013 | F16L 5/10 |
| EP | 3012933 A2 | * | 4/2016 | H02G 3/22 |
| EP | 3 279 537 A1 | | 2/2018 | |
| EP | 3544132 A1 | * | 9/2019 | H02G 3/065 |
| EP | 3865350 A1 | * | 8/2021 | B60R 16/0222 |
| GB | 2448049 A | * | 10/2008 | B60R 16/0222 |
| JP | H08 107620 A | | 4/1996 | |
| KR | 20070009910 A | * | 1/2007 | |
| KR | 20100134770 A | * | 12/2010 | |
| KR | 101496929 B1 | * | 3/2015 | |
| RU | 2502166 C2 | * | 12/2013 | E04F 15/024 |
| SE | 543690 C2 | * | 6/2021 | B60R 16/0222 |
| WO | WO-2009147763 A1 | * | 12/2009 | B60R 16/0222 |
| WO | WO-2010092101 A1 | * | 8/2010 | H02G 3/22 |
| WO | WO-2011121829 A1 | * | 10/2011 | H02G 15/013 |
| WO | WO-2012031543 A1 | * | 3/2012 | F04D 13/0693 |
| WO | WO-2012111179 A1 | * | 8/2012 | B60R 16/0222 |
| WO | WO-2013031260 A1 | * | 3/2013 | B60R 16/0222 |
| WO | WO-2016153045 A1 | * | 9/2016 | B60R 16/0222 |
| WO | WO-2017221675 A1 | * | 12/2017 | B60R 16/0222 |
| WO | WO-2018088181 A1 | * | 5/2018 | B60R 16/0215 |
| WO | WO-2020059392 A1 | * | 3/2020 | B60R 16/0222 |
| WO | WO-2020227766 A1 | * | 11/2020 | B01D 29/071 |
| WO | WO-2021104603 A1 | * | 6/2021 | H02G 15/076 |
| WO | WO-2021215209 A1 | * | 10/2021 | B60R 16/02 |
| WO | WO-2021223993 A1 | * | 11/2021 | H01R 11/12 |
| WO | WO-2022033776 A1 | * | 2/2022 | |

OTHER PUBLICATIONS

European Patent Office International Search Report and Written Opinion of the International Searching Authority, Application No. PCT/EP2021/068844, dated Sep. 23, 2021, 16 pages.

National Intellectual Property Administration, PRC, Notification of the First Office Action, Application No. 202180055663.1, dated Oct. 16, 2023, 10 pages.

* cited by examiner

GASKET FOR AN ELECTRIC CABLE

CROSS-REFERENCE TO RELATED APPLICATIONS

This application is the national phase entry of international patent application no. PCT/EP2021/06844 filed Jul. 7, 2021 and claims the benefit of German patent application No. 10 2020 004 934.6 filed Aug. 13, 2020, the disclosures of which are incorporated herein by reference in their entirety.

TECHNICAL FIELD

The subject matter relates to a gasket for an electrical cable as well as a housing with such a gasket.

BACKGROUND ART

The sealing of electrical cables, especially in automotive applications, has enormous relevance for the durability of the electrical installation. Particularly in automotive applications, where the amount of cabling is constantly increasing, high demands are placed on the sealing of cable entries in housings. This is due on the one hand to the dynamic load situation of the cable entry into the housing and on the other hand to the high exposure to corrosive substances, such as saline water. Moisture must be prevented from entering an housing through the seal along the cable and attacking the electrical connection(s) located there.

The increasing amount of cabling means that a wide variety of cable geometries are being installed in a vehicle at the same time. It is quite conceivable, for example, that flat conductors are installed in a vehicle's electrical system in addition to round conductors. Round and flat conductors have very different cross-sectional geometries, but must be able to be inserted tightly into a housing.

The subject matter was based on the object to provide a gasket that provides a reliable seal against the ingress of longitudinal water in a wide variety of cable geometries.

The gasket and the housing are used in particular in automotive wiring systems. Automotive wiring systems are in particular wiring systems of motor vehicles, in particular of passenger cars or trucks, but also two-wheelers and other motor-driven vehicles.

The electrical cable usually has a metallic cable core, which is formed from solid material or strands, and an insulator surrounding this core. An electric cable is usually stripped of its insulation at the end for contacting with other cables or electric components. The then bare metal of the cable core is connected to the other component, in particular by form fit and/or material locking, for example by screwing, soldering, welding or the like. The transition between the two metallic components must be protected against corrosion.

Frequently, such a transition is within a housing, which in itself is watertight. However, the insertion of the cable into the housing presents a challenge in terms of watertightness. An electrical cable, with its insulator, is usually inserted into a housing through a grommet. The grommet has a through channel through which the cable extends. The through channel of a grommet extends from a first end face to a second end face of the grommet. This through channel is circumscribed by an inner lateral surface of the grommet. This inner lateral surface generally serves to seal the cable.

It is known, for example, to dimension a grommet or a shrink sleeve in such a way that they are adapted to the conductor cross-section of the cable including the insulator and the cable is pushed into the grommet in an interference fit. Of course, this only works for a cable of a certain cross-section geometry.

In order to achieve improved sealing capabilities compared to a shrink sleeve, a grommet usually has at least two sealing lips spaced apart from one another in the longitudinal direction and arranged on the inner lateral surface of the grommet and pointing inward. Preferably, the sealing lips are fully circumferential and fit snugly against the cable. The sealing lips allow the inner clear width of the grommet to adapt to different cable cross sections. The sealing lips have approximately the same material thicknesses as the rest of the lateral surface and are elastically deformable. The sealing lips point radially inwards. The sealing lips are better able to deform elastically radially outward than the lateral surface of the grommet itself. As a result, the sealing lips fit more closely to the cable than just an ordinary grommet. This is particularly true in the case of irregularities on the outer circumference of the cable, where the sealing lips still enable a sealing effect.

However, even these measures are not always sufficient, so that the subject matter was based on the object of improving the sealing effect, starting from known gaskets.

SUMMARY OF THE INVENTION

For an optimized sealing effect compared to conventional grommets, but also for an adaptation of the gasket to different cable cross sections of the cable to be sealed, the grommet in question has at least two sealing areas arranged next to each other in the longitudinal direction and spaced apart from each other by a circumferential separating region. These two sealing areas are arranged on the respective end faces of the grommet, a first sealing area of the sealing areas facing the first end face and a second sealing area of the sealing areas facing the second end face. The separation region, which has a smaller wall thickness of the lateral surface of the grommet than the lateral surface of the grommet in the sealing regions, ensures that the sealing regions can move relative to one another under dynamic loads without any movement in the first sealing region leading to a significant impairment of the sealing effect in the second sealing region and/or vice versa. The wall thickness refers to the grommet, in particular the wall thickness of the lateral surface of the grommet, in particular the distance between the inner and outer lateral surfaces of the grommet. The reduced wall thickness results in increased elasticity of the grommet in the separation area. This increased elasticity allows the areas to move relative to each other both longitudinally and radially to the longitudinal direction.

According to one embodiment, it is proposed that the separation region is formed by a circumferential, radially inwardly facing groove. This groove is attached to the outer lateral surface of the grommet and separates the first sealing area from the second sealing area. The groove reduces the wall thickness of the grommet in the region of the groove base relative to at least parts of the remainder of the grommet, so that the grommet is more flexible in the region of the groove than in the region away from the groove. It is proposed that the groove is a fillet.

According to one embodiment, it is proposed that the groove is formed from the first sealing region by a first slope extending radially inwards towards the second sealing region by a slope extending radially outwards. The slopes form the groove walls. In the first sealing region, the outer lateral surface initially extends essentially parallel to the longitudinal axis of the grommet. Towards the groove, the outer lateral surface then runs along the first slope at least partially radially inwards. Starting from the groove base, the outer lateral surface extends radially outward along the second slope to the second sealing region, in which the outermost lateral surface again extends essentially parallel to the longitudinal axis of the grommet.

For particularly good elasticity of the two sealing regions relative to each other, it is proposed that the first slope is inclined at a greater angle to the longitudinal axis than the second slope.

According to one embodiment, it is proposed that sealing lips are arranged in each of the sealing regions. As already explained at the outset, radially inwardly facing sealing lips are provided on the inner circumferential surface of the grommet. Each of the sealing areas has at least one, preferably at least two, such sealing lips. Due to the taper in the separation area, the sealing areas can oscillate against each other. If at least one sealing lip is arranged in each of the sealing areas, improved sealing against longitudinal water ingress can be achieved.

To ensure that the grommet on the cable fits particularly snugly at the second end face, it is suggested that the wall thickness of the second sealing region tapers in the direction of the second end face. This then smaller wall thickness leads to a higher elastic flexibility and thus a better snug fit of the inner lateral surface of the second sealing area to the outer circumference of the cable arranged in the grommet.

According to one embodiment, it is proposed that a radially inwardly extending longitudinal axis of the sealing lips is inclined with respect to a transverse plane extending perpendicular to the longitudinal axis. The sealing lips have a radially inwardly extending longitudinal extent. The axis of this longitudinal extension is inclined with respect to a radius which is perpendicular to the longitudinal axis. In particular, the inclination is such that the sealing lips are inclined in the direction of the second end face. This inclination of the sealing lips relative to the radius enables the sealing lips to bear against the inserted cable with a larger contact surface.

According to one embodiment, a particularly high degree of sealing against longitudinal water ingress for both flat cables and round cables is achieved by two sealing lips arranged next to each other in the longitudinal direction having different cross-sectional profiles from each other. In a cross-section through the sealing lips in a plane spanning along the longitudinal extension of the sealing lip and the longitudinal axis of the grommet, two sealing lips arranged next to each other can have cross-sectional profiles that differ from each other. The different cross-sectional profiles mean that at least one of the sealing lips is always in close contact with the cable under a wide variety of, often dynamic, load situations, thus ensuring a seal. Depending on the load on the cable, whether due to bending, torsion, shear or the like, the cross-sectional profile of the sealing lip can be relevant for the tightness of the latter. If two sealing lips with different cross-sectional profiles are formed next to each other, this results in optimized sealing.

As previously explained, the sealing lips are inclined relative to an axis running perpendicular to the longitudinal axis. For particularly good sealing, especially in combination with different cable cross sections, it is also proposed that two sealing lips arranged next to each other in the longitudinal direction of the grommet are inclined differently from each other with respect to the transverse plane. In particular, the angle of inclination is alternating, so that intermittently one of at least two angles of inclination is realized at each of the sealing lips.

According to an embodiment, the different cross-sectional profiles are such that at least one of the sealing lips has a pointed cross-sectional profile and that at least one of the sealing lips has an arcuate cross-sectional profile. Each of these cross-sectional profiles may be implemented in an n-th sealing lip (n>=2). Arcuate can also be understood as spherical and pointed can also be understood as arrow-shaped.

According to one embodiment, it is proposed that a respective one of the sealing lips has side walls extending toward an end face. The side walls extend longitudinally along the sealing lip and are substantially parallel to each other. However, it is preferred that the length of the side walls is different from each other, preferably the side wall facing the first end face being longer than the side wall facing the second end face. By this different design of the side walls, an inclination of the sealing lips towards the second end face is achieved. The sealing lips thus preferably rest on the cable with their side wall facing the first end face and seal this.

According to one embodiment, it is proposed that a respective one of the sealing lips spans a clear opening in the through channel. In a cross-section perpendicular to the longitudinal axis, the sealing lips form the through channel with a clear opening of the grommet. The clear opening is the area that is clear in the through channel for the cable. The cable is inserted into the through channel. Preferably, the clear opening of the through channel in the unobstructed state of the grommet is different from the cross-sectional profile of the cable to be accommodated. When the cable is inserted into the clear opening, the grommet deforms elastically and the sealing lips are pressed against the outer circumference of the cable. Preferably, the circumference of the clear opening of the through channel is smaller than the outer circumference of the cable to be accommodated.

Preferably, the clear opening is spanned by two opposite longitudinal sides and two opposite transverse sides of the sealing lip. That is, the clear opening is preferably not round or oval, but substantially rectangular, whereby radii can be formed in the respective corners to enable particularly good adaptation of the sealing lips to the cable to be accommodated.

As already explained, the clear opening is substantially rectangular, wherein radii can be formed at the corners. For this purpose, it is proposed in particular that a transition between a longitudinal side and a transverse side has an inner radius. Such an inner radius should generally be smaller than an outer radius of the counterpart/cable to be sealed.

According to one embodiment, it is proposed that at least one of the longitudinal sides is curved radially inward and/or that at least one of the transverse sides is curved radially inward. At least one longitudinal side and or at least one transverse side may be radially inwardly curved. A sealing lip with inwardly curved sides may alternate with a sealing lip with sides extending parallel to each other.

A bellows may be disposed on the grommet between the first sealing region and the first end face to allow movement of the grommet relative to the housing comprising the grommet.

To seal the grommet to a housing, it is proposed that a flange extending radially outward is disposed on the first end face. The flange can be arranged on the housing and pressed to the housing wall. The flange may seal a receptacle/opening in the housing with respect to the grommet.

In another aspect, a housing having a grommet as previously described is provided. This housing has a receptacle/opening for receiving a cable. A subject grommet may be arranged on said receptacle, wherein said grommet may be arranged on said receptacle projecting outwardly from said housing or facing inwardly into said housing.

According to one embodiment, it is proposed that the flange of the grommet is clamped between a housing wall and a clamping element. This seals the grommet with respect to the housing. The flange may abut and be pressed against the housing wall on the inside of the housing, or preferably on the outside of the housing. The flange may provide a seal between the grommet and the housing.

In another aspect, there is provided a system comprising a housing previously described. In this system, at least two receptacles are provided and gaskets are provided on each of the receptacles. The gaskets are formed such that a first gasket sealingly receives a round cable and a second gasket sealingly receives a flat cable.

BRIEF DESCRIPTION OF THE DRAWINGS

In the following, the subject matter will be explained in more detail with reference to a drawing showing embodiments. The drawings show.

DETAILED DESCRIPTION OF SPECIFIC EMBODIMENTS

Figure 1A:
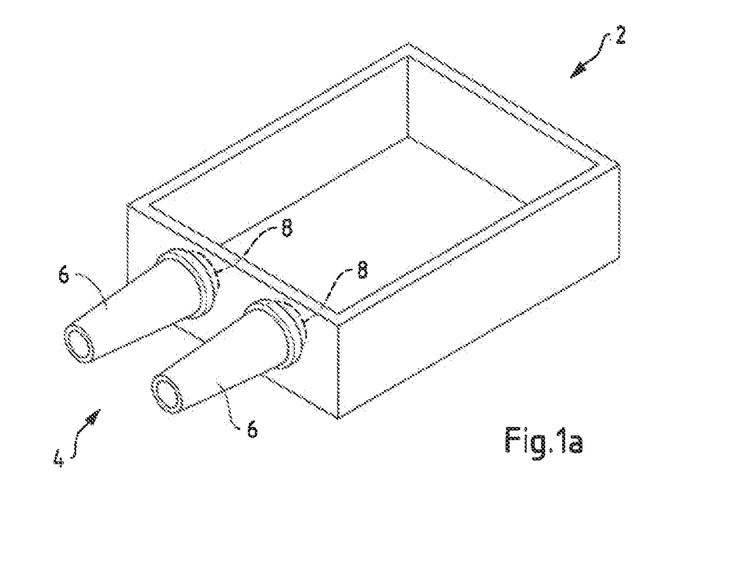
FIG. 1a, b a housing with a gasket according to embodiments.

FIG. 1a shows a housing 2. The housing 2 can be, for example, a housing of an electrical add-on part, a fuse box, a distribution box, in particular for automotive applications, or the like. The housing 2 may be formed with a gasket 4 for accommodating cables. For accommodating cables, the housing 2 has at least one opening 8 at which the gasket 4 is arranged. The gasket 4 may have one or more grommets 6. The grommets 6 are arranged directly at a respective opening 8.

In this context, it should be mentioned that gaskets 4 with two grommets 6 are predominantly shown below, but this is purely exemplary. Gaskets 4 with one grommet 6 or more than two grommets 6 are of course covered by the subject matter and all embodiments shown herein apply to corresponding numbers of grommets 6.

In FIG. 1a, the grommets 6 are shown to be arranged at the openings 8 facing outwardly, i.e., extending away from the housing 2. The arrangement of the gasket 4 on the housing 2 is effected via a clamping reception of a flange of the gasket 4, as will be shown below. A cable with its insulation can be inserted through each of the grommets 6 and thus guided through the opening 8 into the interior of the housing 2.

Figure 1B:
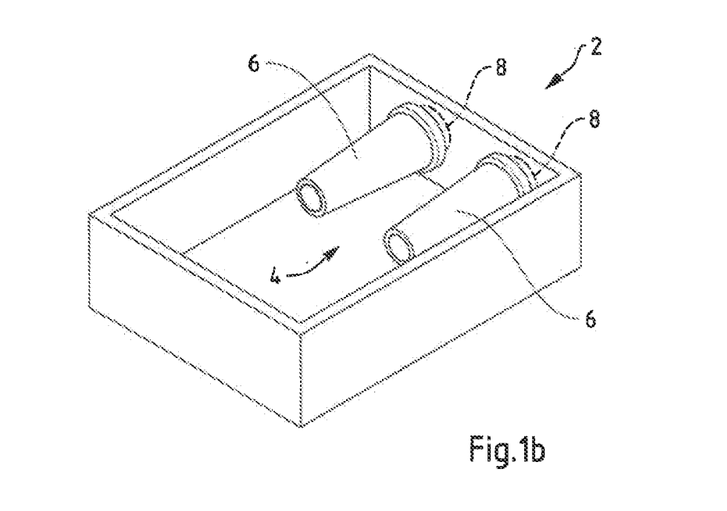

FIG. 1b shows another embodiment of a housing 2, but in which the grommets 6 are arranged and outwardly at different openings 8 of a single housing 2 is also possible. The facing inwardly on the housing 2. A combination of grommets 6 arranged facing both inwardly grommets 6 of the gasket 4 are designed in such a way that they have particularly good sealing properties against longitudinal water and can accommodate both flat cables and round cables in a sealing manner.

Figure 2:
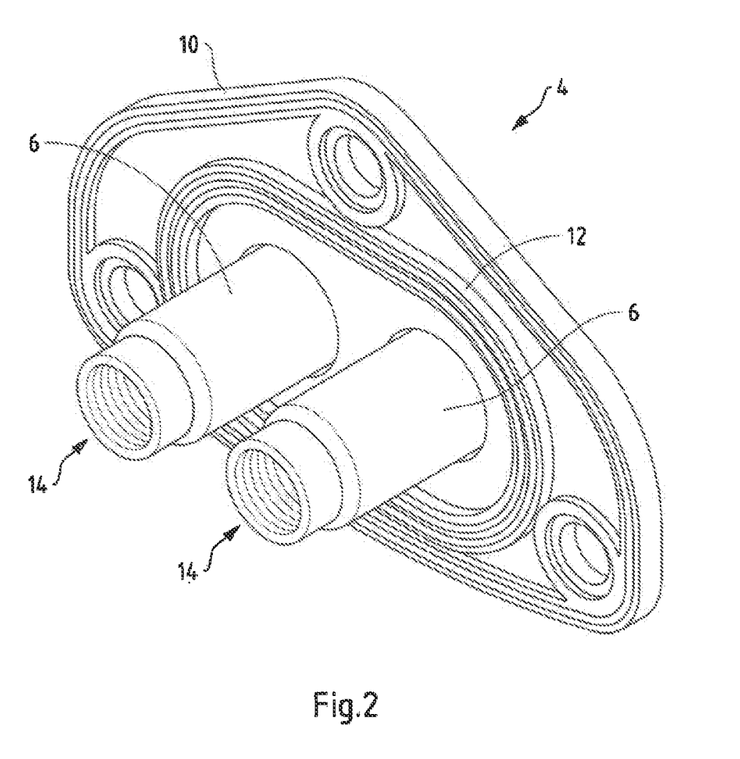
FIG. 2 a gasket with grommets according to embodiments.

FIG. 2 shows a gasket 4 in an unloaded state (without cable), so that the grommets 6 of the gasket 4 are unloaded and not deformed. It can be seen that the grommets 6 open into a flange 10. The flange 10 may have projections 12 or recesses on its surface facing in the direction of the grommets 6. Corresponding projections 12 may also be provided on the surface of the flange 10, which is not shown. The grommets 6 extend from the flange 10, into which they open in a first end face (not shown), to a second end face 14, the grommets 6 having a circumferential envelope surface. The grommet spans a through channel with a clear opening into which a cable can be inserted, as will be shown below. The gasket 4 is placed on a housing 2 such that the grommets 6 are arranged at openings 8. The gasket 4 is then pressed against a clamping element (not shown) with respect to the housing 2. The flange 10 is clamped between the clamping element and the housing 2, so that the flange 10 forms a seal against the opening 8. The through channel of the grommets 6 is used to push a cable into the housing 2.

Figure 3A:
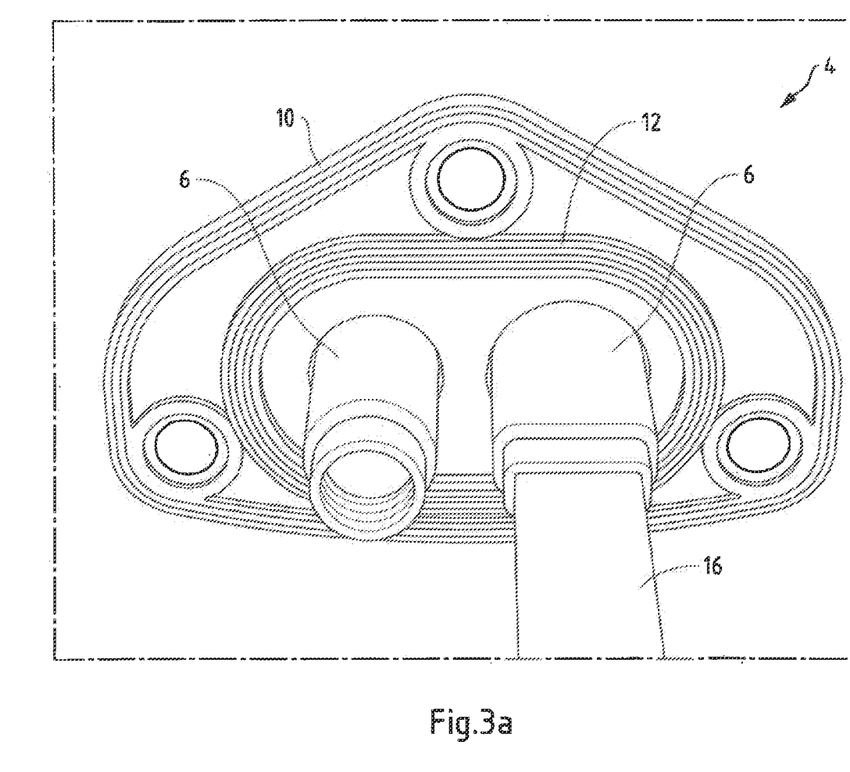
FIG. 3a-c gaskets with grommets and inserted cables according to embodiments.

FIG. 3a shows the gasket 4 according to FIG. 2, in which a flat cable 16 is inserted into one of the grommets 6. As can be seen, the flat cable 16 causes a deformation of the cross-section of the grommet 6. The grommet 6 rests against the flat cable 16 and forms a longitudinally watertight seal on the flat cable 16, in particular its insulation.

Figure 3B:
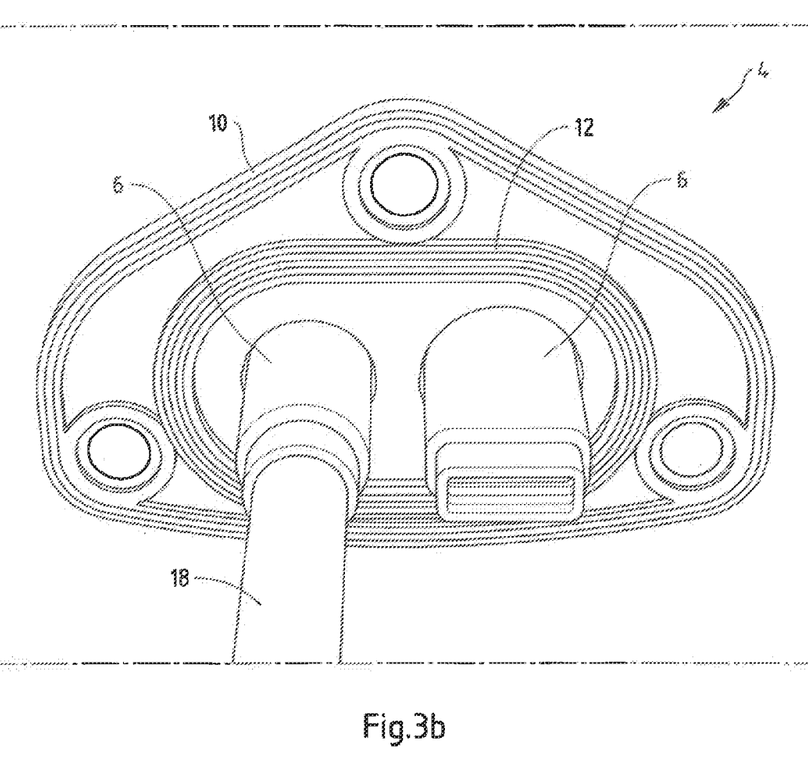

FIG. 3b shows a gasket 4 according to FIG. 2, in which a round cable 18 is inserted into the grommet 6. Here, too, it can be seen that the grommet 6 rests with its inner lateral surface against the insulation of the round cable 18.

Figure 3C:
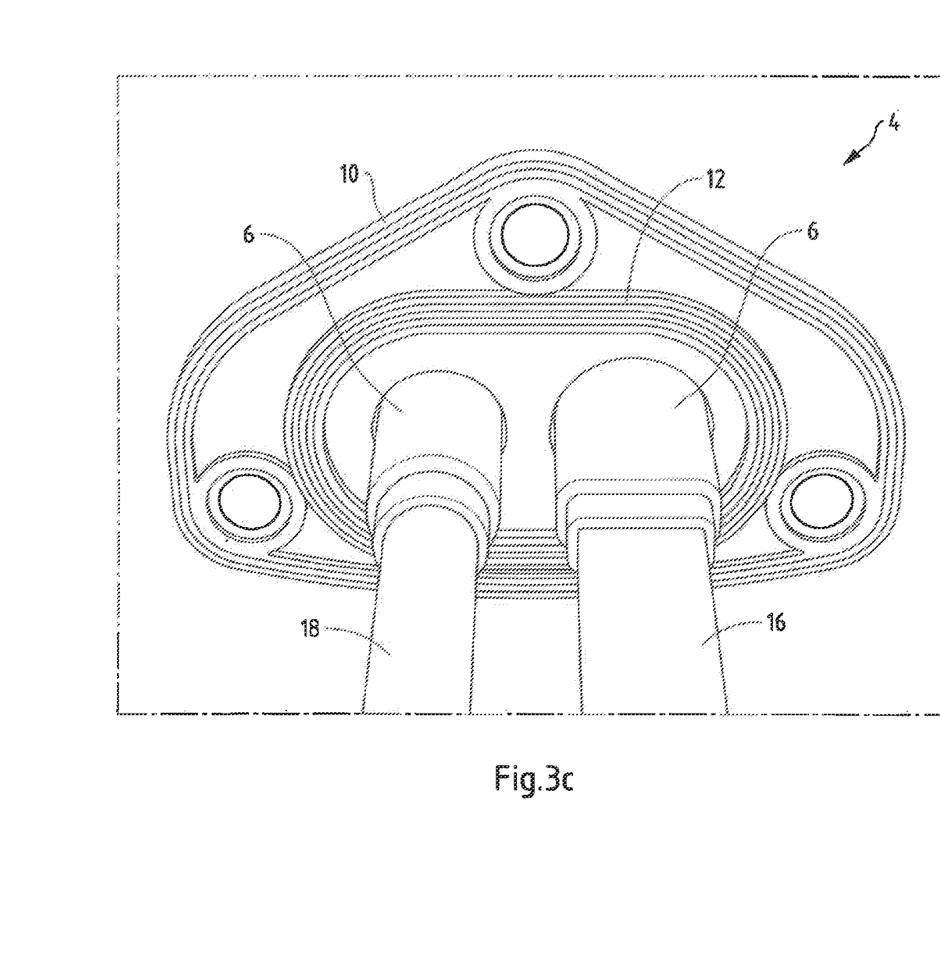

FIG. 3c shows a further embodiment of a gasket 4 according to FIG. 2, in which a round cable 18 on the one hand and a flat cable 16 on the other hand are each inserted into one of the grommets 6. It can be seen that the grommets 6 are formed to receive different types of cables 16, 18, whereby, in this case, the design of the grommets 6 achieves longitudinal watertightness for a wide variety of cable cross-sections.

Figure 4A:
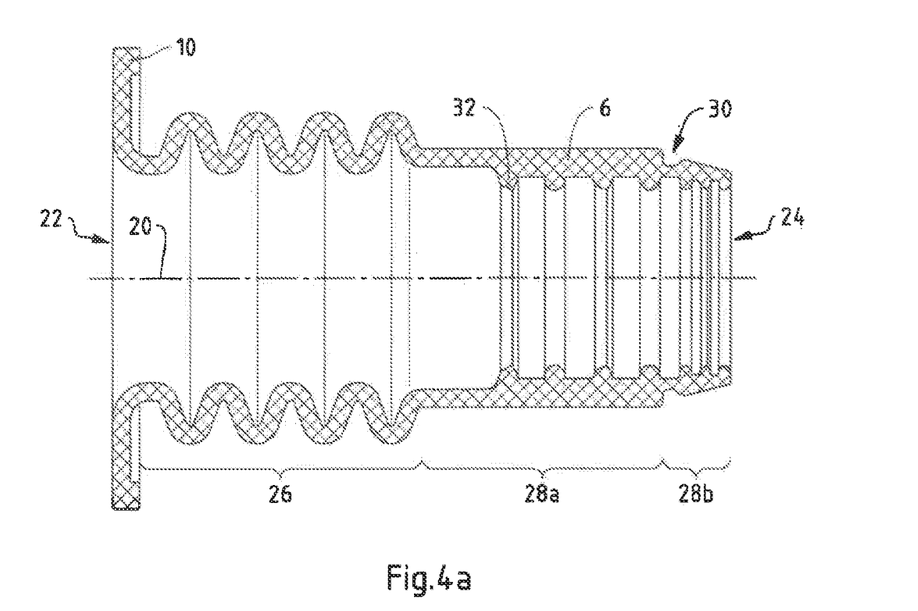
FIG. 4a, b a longitudinal section through a grommet according to an embodiment.

The grommets 6 extend in a longitudinal direction along a longitudinal axis 20, as shown in FIG. 4a. FIG. 4a shows a longitudinal section through a grommet 6 along the longitudinal axis 20. It can be seen that the grommet 6 extends from a first end face 22 to a second end face 24. At the end faces 22, 24, the grommet 6 has an opening extending through the grommet 6 between the end faces 22, 24. At the first end face 22, the flange 10 may be provided radially outwardly on the grommet 6. Starting from the first end face 22, the grommet 6 extends along the longitudinal axis 20 in an optional bellows 26.

Starting from the bellows 26, the grommet 6 extends into a first sealing area 28a and a second sealing area 28b, wherein the sealing areas 28a, b are separated from each other by a separation area 30.

The separating region 30 is characterized by a preferably completely circumferential, or also only partially circumferential, taper of the material thickness of the grommet 6.

In particular, the separating region 30 is formed by an at least partially circumferential groove. Through this separating region 30, the first sealing region 28a and the second sealing region 28b are at least partially mechanically decoupled, so that a relative movement between the sealing regions 28a, b is facilitated. This at least partial decoupling of the sealing regions 28a, b allows each sealing region 28a, b to develop its own sealing effect. An impairment of the sealing effect of one of the sealing areas 28a, b does not directly lead to an impairment of the sealing effect of the other sealing area 28a, b. The extension of the separating region in the longitudinal direction can be selected in such a way that the groove is suitable for receiving a clamping ring, cable tie or the like. As a result, a further seal can be provided via the groove in the area of the separating region.

Figure 4B:
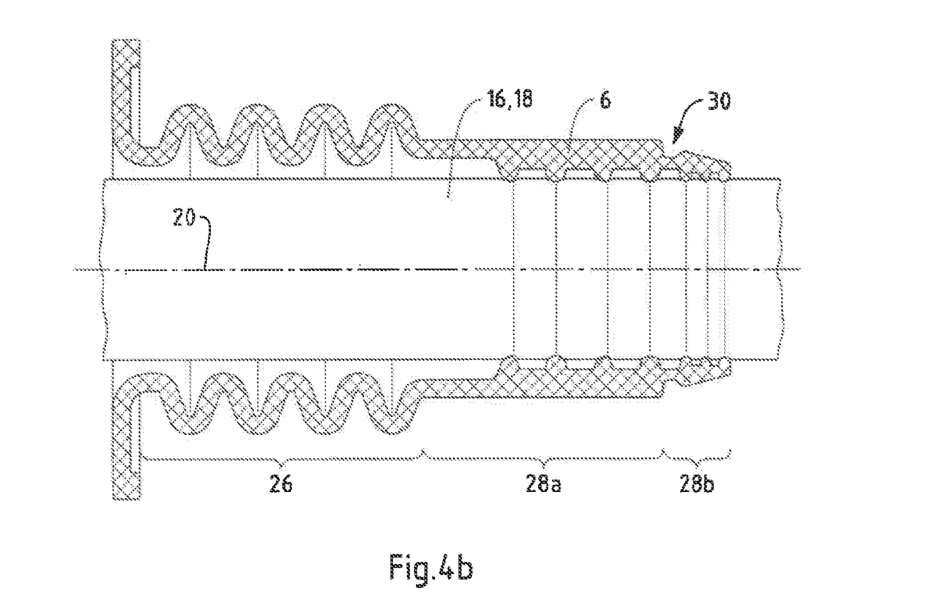

In each of the sealing areas 28a, b, sealing lips 32 pointing in the direction of the longitudinal axis 20 are provided on the inner lateral surface of the grommet 24. The sealing lips 32 are arranged side by side, spaced apart from one another in the direction of the longitudinal axis 20, on the inner lateral surface of the grommet 6. The sealing lips 32 are completely circumferential on the inner lateral surface. In the inserted state of a cable 16, 18, as can be seen in FIG. 4b, the sealing lips 32 lie against the outer insulation of the cables 16, 18 and thus form a protection against entry from longitudinal water.

The material thickness of the grommet 6 tapers in the second sealing area towards the second end face, so that it can fit particularly well against the cable there. The design of the sealing lips 32 is shown in more detail in FIG. 5. The separating region 30 is also shown in more detail.

Figure 5:
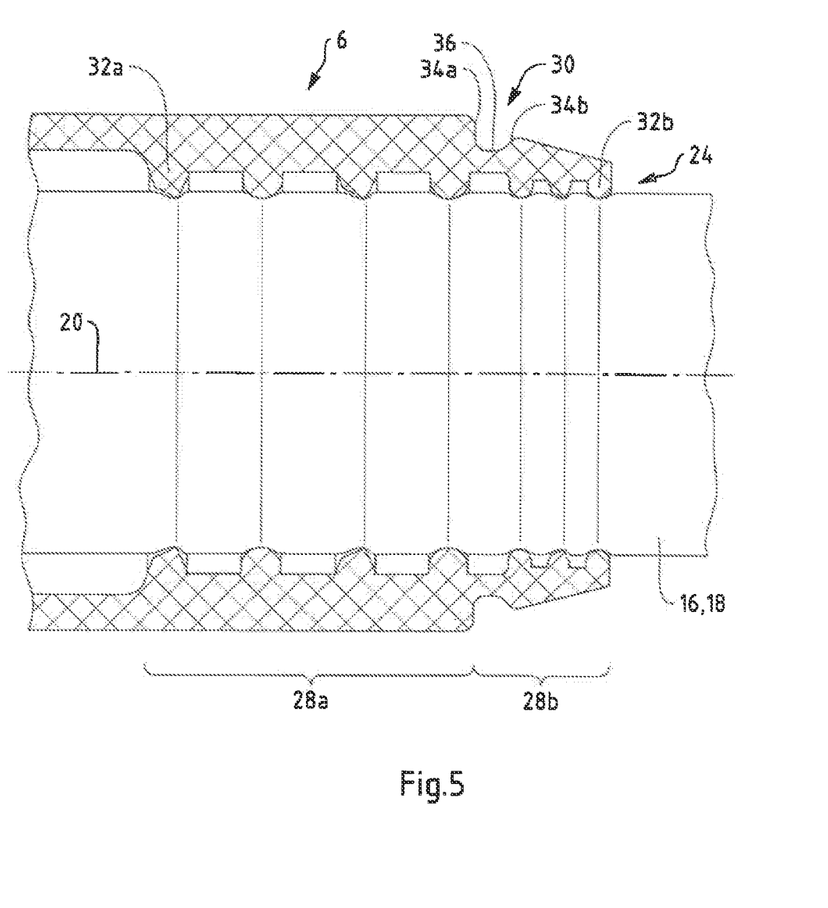
FIG. 5 a detailed view of a grommet according to an embodiment.

FIG. 5 is a detailed representation of the grommet 6 with the sealing areas 28a, b. The longitudinal extent of the sealing areas 28a, b can be different from one another, in particular the second sealing area 28b facing the second end face 24 can be shorter than the first sealing area 28a.

In FIG. 5, it can be seen that the outer lateral surface of the grommet 6, starting from the first end face 22, runs essentially parallel to the longitudinal axis 20. In the region of the separation area 30, the outer lateral surface tilts radially inwards with a first slope 34a. The angle of inclination of the slope 34a is preferably between 45° and 90° with respect to the longitudinal axis 20. Starting from the first slope 34, the outer lateral surface of the grommet 6 extends towards a groove base 36. The groove base 36 represents the region of the separation area 30 with the lowest material/wall thickness of the grommet 6. Starting from the groove base 36, a second slope 34b extends radially outwards, the slope 34b being set at a smaller angle to the longitudinal axis 20 than the first slope 34a, for example between 5° and 45°.

At the end of the second slope 34b, the outer envelope surface of the grommet 6 preferably again extends substantially parallel to the longitudinal axis 20, but may also extend with an inclination of between 5° and 15° with respect to the longitudinal axis 20 towards the second end face 24. The separation region 30 represents a constriction of the wall thickness of the grommet 6, thereby causing a partial mechanical decoupling of the sealing regions 28a, b.

Each of the sealing regions 28a, b has sealing lips 32a, b. It can be seen that the sealing lips 32a in the first sealing region 28a have a greater extension both in the longitudinal direction 20 and transversely thereto relative to the sealing lips 32b in the second sealing region 28b. The sealing lips 32a, b are spaced apart along the longitudinal axis 20. In the longitudinal section shown, which lies in a plane spanned by the longitudinal axis 20 and a radius of the grommet 6, the sealing lips 32a, b each have alternating cross-sectional profiles that differ from one another.

In the first sealing region 28a, pointed sealing lips 32a alternate with round/ball-shaped sealing lips 32a. The sealing lips 32a have a longitudinal extension in an extension direction 38. The extension direction 38 can be inclined by 1° to 10° relative to a radius 40 extending to the longitudinal axis 20. The inclination is preferably in the direction of the first end face 24. This realizes a larger contact area of the sealing lips 32a on the insulator of the cable 16, 18.

In the first sealing region 28a, four sealing lips 32a are provided, two pointed sealing lips 32a and two round sealing lips 32a respectively.

In the second sealing region 28b, corresponding sealing lips 32b can be formed with preferably smaller dimensions, but with the same orientation and profile shape. In FIG. 5, it can be seen that three sealing lips 32b are located in the sealing area 38b, with two round sealing lips 32b framing a tapered lip 32b. The sealing lips 32b may also be inclined with respect to a radius 40.

Figure 6:
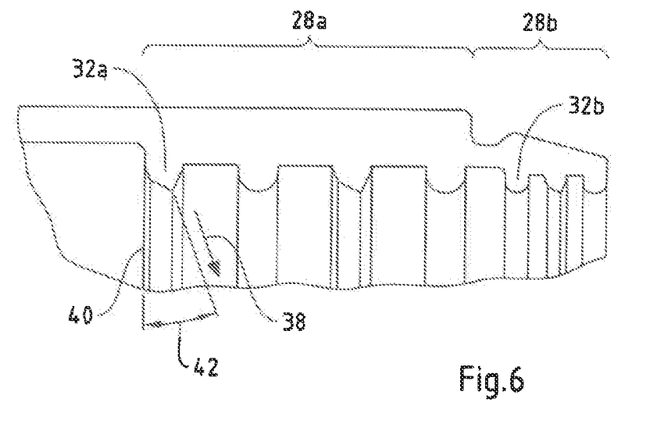
FIG. 6 a schematic view of sealing lips according to an embodiment.

FIG. 6 schematically shows the inclination of the sealing lips 32. It can be seen that the direction of the longitudinal extension 38 is inclined to the radius 40 by an angle 42. The angle 42 is preferably between 1° and 45°. In particular, it is possible for inclined sealing lips 32a and non-inclined sealing lips 32a to alternate. The inclined sealing lips 32a are preferably tapered, whereas the non-inclined sealing lips 32a are round/ball-shaped.

At least four sealing lips 32a may be provided in the first sealing region 28a, wherein, starting from the first end face 22, inclined sealing lips 32a alternate with non-inclined sealing lips 32a. That is, in the longitudinal axis 20, the sealing lips 32a are inclined/non-inclined/inclined/non-inclined. Such an intermittent sequence is preferred for the first sealing region 28a. In particular, the number of sealing lips is even.

In the second sealing region 28b, the sequence of sealing lips 32b may be different, in particular a non-inclined sealing lip 32b may be followed by an inclined sealing lip 32b, which in turn is followed by a non-inclined sealing lip 32b. In particular, the number of sealing lips 32b in the second sealing region 28b may be odd. The respective outer sealing lips 32b may be round/ball-shaped and not inclined.

Figure 7:
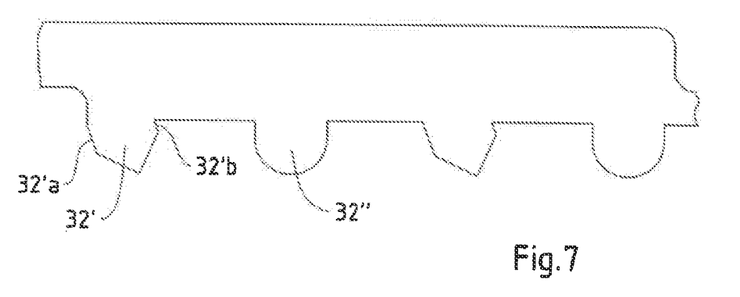
FIG. 7 a detailed view of sealing lips according to an embodiment.

FIG. 7 shows an enlargement of the sealing lips 32. An inclined sealing lip 32' may be tapered and have a first side wall 32'a, which is longer than a second side wall 32'b. A second sealing lip 32" may be round/ball-shaped in cross-sectional profile, as shown in FIG. 7.

In a cross-section, perpendicular to the longitudinal axis 20, the grommet 6 has a through channel with a clear opening. The cable 18/16 is inserted into this clear opening (clear width). The sealing lips form a receiving profile/clear opening into which the cable 16/18 can be inserted.

Figure 8A:
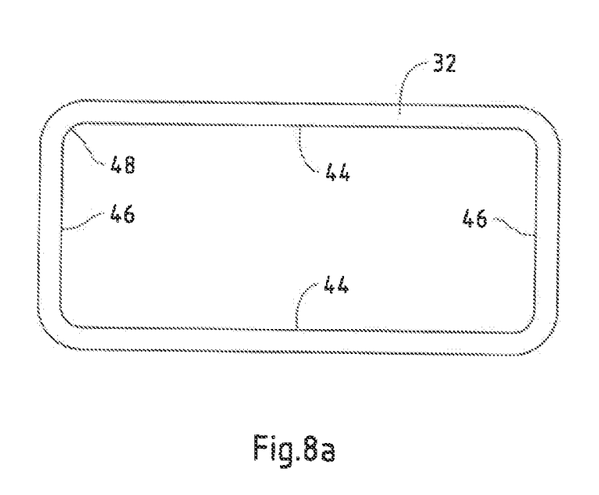
FIG. 8a, b a clear opening of sealing lips in a cross-section according to an embodiment.

It is particularly preferred that the sealing lips 32 have alternating different cross-sectional profiles. Here, it is particularly preferred that successive sealing lips 32 have different clear openings, as illustrated by FIG. 8a. FIG. 8a shows a top view parallel to the longitudinal axis 20 of a sealing lip 32 having two longitudinal sides 44 and two broad sides 46. The longitudinal sides 44, like the broad sides 46, run parallel to one another and merge into one another at a radius 48. This can be, for example, the sealing lip 32' or the sealing lip 32".

Figure 8B:
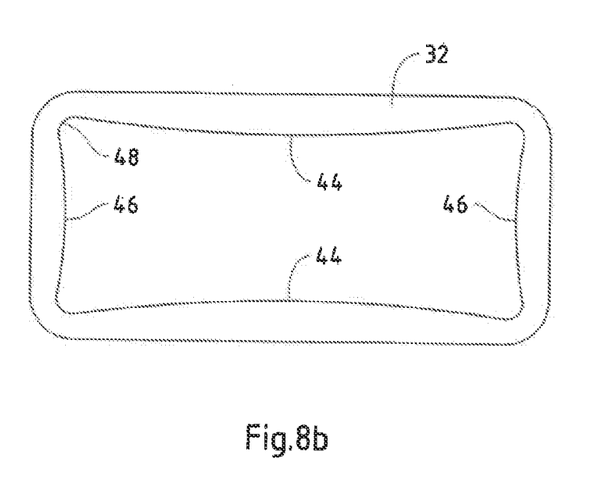

The respective other sealing lip 32', 32" is shown in FIG. 8b. Here, the long sides 44 run facing each other inwardly curved and the broad sides 46 also run facing each other inwardly curved. The transitions between the long sides 44 and the wide sides 46 are formed by radii 48 that are smaller than the radii 48 according to FIG. 8a.

Due to the different clear openings, which alternate with each other, according to FIGS. 8a and 8b, longitudinal watertightness can be ensured in particular for cables with different cable cross sections, in particular round cables and flat cables.

LIST OF REFERENCE SIGNS

2 Housing
4 Gasket
6 Grommet
8 Opening
10 Flange
12 Projection
14 End face
16 Flat cable
18 Round cable
20 Longitudinal axis
22, 24 End face
26 Bellows
28a, b Sealing area
30 Separation area
32 Sealing lip
34a, b Slope
36 Groove base
38 Longitudinal extension
40 Radius
42 Angle
44 Long side
46 Broad side
48 Radius

What is claimed is:

1. Gasket for an electrical cable having
a grommet extending in a longitudinal direction from a first end face to a second end face and having a through channel, the through channel being enclosed by an inner lateral surface of the grommet, and
at least two sealing lips which are spaced apart from one another in the longitudinal direction and are arranged on the inner lateral surface of the grommet and point inwards, wherein
the grommet has at least two sealing regions which are arranged next to one another in the longitudinal direction and are spaced apart from one another by a circumferential separating region,
a first sealing region of the at least two sealing regions faces the first end face and a second sealing region of the at least two sealing regions faces the second end face, and
the circumferential separating region has a smaller wall thickness than the at least two sealing regions,
wherein
the at least two sealing lips are arranged next to one another in the longitudinal direction and have different cross-sectional profiles that alternate from one to another, and/or
the at least two sealing lips are arranged next to one another in the longitudinal direction and are alternately inclined differently from one another with respect to the transverse plane.

2. The gasket of claim 1, wherein the separating region is formed by a circumferential, radially inwardly pointing groove.

3. The gasket of claim 2, wherein the groove extends from the first sealing region with a radially inwardly extending first slope to the second sealing region with a radially outwardly extending second slope, the first slope being inclined at a greater angle to the longitudinal axis than the second slope.

4. The gasket of claim 1, wherein the at least two sealing lips are arranged in each of either the first and second sealing regions.

5. The gasket of claim 1, wherein the second sealing region has a wall thickness that tapers in direction of the second end face.

6. The gasket of claim 1, wherein a radially inwardly extending longitudinal axis of the at least two sealing lips is inclined with respect to a transverse plane extending perpendicularly to the longitudinal axis, wherein the at least two sealing lips are inclined in the direction of the second end face.

7. The gasket of claim 1, wherein at least one of the at least two sealing lips has a pointed cross-sectional profile and/or that at least one of the at least two sealing lips has an arcuate cross-sectional profile.

8. The gasket of claim 1, wherein a respective one of the at least two sealing lips has side walls extending towards the end faces of the grommet, wherein a side wall of the side walls facing the first end face is longer than a side wall of the side walls facing the second end face.

9. The gasket of claim 1, wherein a respective one of the at least two sealing lips spans a clear opening in the through channel, the clear opening being spanned by two opposite longitudinal sides and two opposite transverse sides.

10. The gasket of claim 9, wherein a transition between a longitudinal side and a transverse side has an inner radius.

11. The gasket of claim 9, wherein at least one of the two opposite longitudinal sides is curved radially inwards and/or that at least one of the two opposite transverse sides is curved radially outwards.

12. The gasket of claim 9, further comprising a bellows arranged between the first sealing region and the first end face.

13. The gasket of claim 9, further comprising a flange extending radially outwardly arranged on the first end face.

14. A housing with the gasket of claim 9 and at least one opening for receiving a cable, wherein
the grommet is arranged projecting from the housing at the at least one opening, or
the grommet is arranged facing into the housing at the at least one opening.

15. The housing of claim 14, further comprising a flange extending radially outwardly arranged on the first end face of the grommet, wherein the flange is clamped between a housing wall and a clamping element.

16. A system comprising the housing of claim 14 having two openings and two gaskets disposed at a respective one of the two openings, wherein a grommet of a first of the two gaskets receives a round cable and a grommet of a second of the two gaskets receives a flat cable.

* * * * *